United States Patent [19]
Saito et al.

[11] Patent Number: 5,836,613
[45] Date of Patent: Nov. 17, 1998

[54] CAR BODY STRUCTURE

[75] Inventors: Kenichi Saito; Tetsuo Maki, both of Kanagawa-ken, Japan

[73] Assignee: Nissan Motor Co., Ltd., Yokohama, Japan

[21] Appl. No.: 788,500

[22] Filed: Jan. 29, 1997

[30] Foreign Application Priority Data

Jan. 29, 1996 [JP] Japan ................................. 8-013109

[51] Int. Cl.$^6$ ................................................. B60R 22/00
[52] U.S. Cl. ............................................................ 280/808
[58] Field of Search .................................. 280/808, 804, 280/805; 297/482

[56] References Cited

U.S. PATENT DOCUMENTS

| | | | |
|---|---|---|---|
| 4,763,925 | 8/1988 | Onoe et al. | 280/808 |
| 4,955,639 | 9/1990 | Yamamoto | 280/808 |
| 5,529,344 | 6/1996 | Yasui et al. | 280/808 |
| 5,685,566 | 11/1997 | Hirase et al. | 280/808 |

*Primary Examiner*—Paul N. Dickson
*Attorney, Agent, or Firm*—Foley & Lardner

[57] ABSTRACT

A nut member, which is arranged in a pillar panel and to which a bolt for supporting a seat belt anchor plate is fixed, comprises a nut main body to which the bolt is fixed and a nut holder supported to the pillar panel to hold the nut main body. The nut holder has a holder portion formed to support a tensile load applied to the nut main body, and engaging means for holding a state in which the nut main body is held in the holder portion and for supporting the nut main body until a compressive load applied to the nut main body is increased up to a predetermined value are provided to at least one of the nut main body and the nut holder. Accordingly, a car body structure can be achieved which can control an allowable value against a compressive load applied to the seat belt anchor plate and support a large tensile load sufficiently.

7 Claims, 5 Drawing Sheets

CAR BODY STRUCTURE

BACKGROUND OF THE INVENTION

The present invention relates to a car body structure and, more particularly, a seat belt anchor structure in a seat belt system for use in a car.

As a conventional car body structure, in particular, as a seat belt anchor structure of a seat belt system for a car, for example, there has been known a structure in which through holes are formed in a center pillar and a pillar reinforcement respectively, then a nut is fixed to the through holes by caulking portions, and then a seat belt anchor plate by which a seat belt is supported to be passed through freely is fixed to the nut with a bolt (see Patent Application Publication 7-149204 as a similar technique).

In such structure, when a compressive load in excess of a predetermined value is applied from the inside of the car to the bolt and/or the seat belt anchor plate because of any cause, the caulking portions of the nut are removed from the through holes which are formed in an inner panel of the center pillar and the pillar reinforcement respectively. Thus the bolt and the seat belt anchor plate supported by the nut are moved to the outer side of a cabin of the car, so that the compressive load exceeding the predetermined value can be absorbed.

In such structure, the magnitude of the compressive load to remove the caulking portion of the nut from the through hole must be set to exceed a breaking load to break down the caulking portion. However, there is no denying that variation in the breaking load of the caulking portion is caused inevitably since the magnitude of the breaking load of the caulking portion is determined depending upon a "caulking force" between the through hole and the caulking portion, i.e., a level of "caulking" made by individual worker. In other words, the magnitude of an allowable value of the compressive load cannot be controlled in a design level, but it depends on operation quality of the worker. Therefore, improvement in determining the magnitude of the breaking load is desirable.

SUMMARY OF THE INVENTION

The present invention has been made in view of the above circumstances, and it is an object of the present invention to provide a car body structure capable of controlling an allowable value of a compressive load and also supporting a large tensile load sufficiently.

In order to overcome the above problems, according to an aspect of the present invention, there is provided a car body structure comprising a nut member arranged in a hollow portion between pillar panels which is confined by an outer panel and an inner panel; and a bolt fixed to said nut member, for supporting a seat belt anchor plate; wherein said nut member includes a nut main body to which said bolt is fixed, and a nut holder supported on said pillar panel, for holding said nut main body, said nut holder has a holder portion formed to support a tensile load applied to said nut main body, and at least one of said nut main body and said nut holder has engaging means for keeping a state where said nut main body is held in said holder portion and for supporting said nut main body until a compressive load applied to said nut main body is increased up to a predetermined value.

In the preferred embodiment, said engaging means are pawl portions formed integrally with at least one of said nut holder and said nut main body.

According to this structure, if a compressive load greater than a predetermined value is applied to the bolt and/or the seat belt anchor plate, such compressive load is applied to the nut main body via the bolt. In this case, since the compressive load can be controlled up to a predetermined value by the nut holder 45, a structure permitting a stable compressive load resistance value can be provided.

In contrast, if a tensile load greater than a predetermined value is applied to the bolt and/or the seat belt anchor plate, such tensile load is applied to the nut main body via the bolt. In this case, since the tensile load can be supported by the holder portion of the nut holder, a structure permitting a stable tensile load resistance value can be provided.

In addition, under the condition where the nut main body is fitted into the holder portion of the nut holder and then is held by the pawl portions, the nut holder may be fixed to the pillar panel by welding, etc. Hence, an assembling operation of the nut holder and the nut main body to the pillar panel is simplified.

Further, because the nut main body can be installed in the nut holder substantially completely, space saving can be achieved.

In the preferred embodiment, said pawl portions are projected on outer positions of said holder portion in a bendable manner so as to contact an outer surface of said nut main body.

According to this structure, by inserting the nut main body into the slanting surfaces of the holder portion of the nut holder and then bending the pawl portions of the holder portion, the pawl portions can be pressed against the surface of the nut main body on the outer side of a cabin of the car, so that the nut main body can be held firmly in the nut holder.

In the preferred embodiment, said pawl portions are projected on inner positions of said nut main body in a bendable manner so as to contact an inner surface of said holder portion of said nut holder.

According to this structure, by inserting the nut main body into the slanting surfaces of the holder portion of the nut holder and then bending the pawl portions of the holder portion, the pawl portions can be pressed against the surface of the nut main body on the outer side of the cabin, so that the nut main body can be held firmly in the nut holder.

In the preferred embodiment, said engaging means is a nut holding member which is arranged on outer positions of said nut main body to hold said nut main body, which has engaging portions engaging with side surfaces of said nut holder.

According to this structure, the engaging means is formed as the nut holding member which is provided separate from the nut main body and the nut holder and has the fitting portion to be fitted into the side surfaces of the nut holder. Therefore, if the compressive load acting to the nut main body is in excess of a predetermined value, impact applied to the seat belt anchor plate can be absorbed by deformation of the fitting portion. Moreover, an allowable compressive load (predetermined value) can be changed and adjusted easily to a desired value by modifying the material and/or shape of the nut holding member.

In the preferred embodiment, said holder portion and said nut main body are formed to have such shapes that said holder portion and said nut main body engage with each other to prevent rotation of said nut main body in said holder portion when they are fixed with a bolt.

According to this structure, the nut main body can be prevented from being rotated when the bolt is to be tightened. A tightening operation of the bolt can also be facilitated upon fixing the seat belt anchor plate.

In the preferred embodiment, side surfaces of said nut main body are narrowed toward an inside of a car like inclined plane, and slanting surfaces are formed in said holder portion so as to fit to said side surfaces of said nut main body.

According to this structure, the direction of bolt tightening hole of the nut main body is regulated in a bolt tightening direction by fitting the nut main body into the holder portion of the nut holder, and therefore the nut main body is held in a so-called "centering" state. Accordingly, a tightening operation of the bolt can be carried out easily and firmly.

Moreover, the tensile load applied to the nut main body is a component of a tensile force of the seat belt which is applied to the seat belt anchor plate in the obliquely forward direction of the car. Therefore, a rotation force acts on the nut main body when the tensile load is applied. On the contrary, since the side surfaces of the nut main body and the slanting surfaces of the holder portion are formed as inclined surfaces which are narrowed toward the inner side of the cabin, both the nut main body and the holder portion have respective surfaces substantially perpendicular to the tensile force of the seat belt. Hence, rotation of the nut main body can be suppressed satisfactorily by the slanting surfaces of the holder portion, and rotation force input into the nut main body can be prevented from applying on the engaging means. As a result, the engaging means can be designed by considering the compressive load only.

DESCRIPTION OF THE PREFERRED EMBODIMENTS

Figure 1:
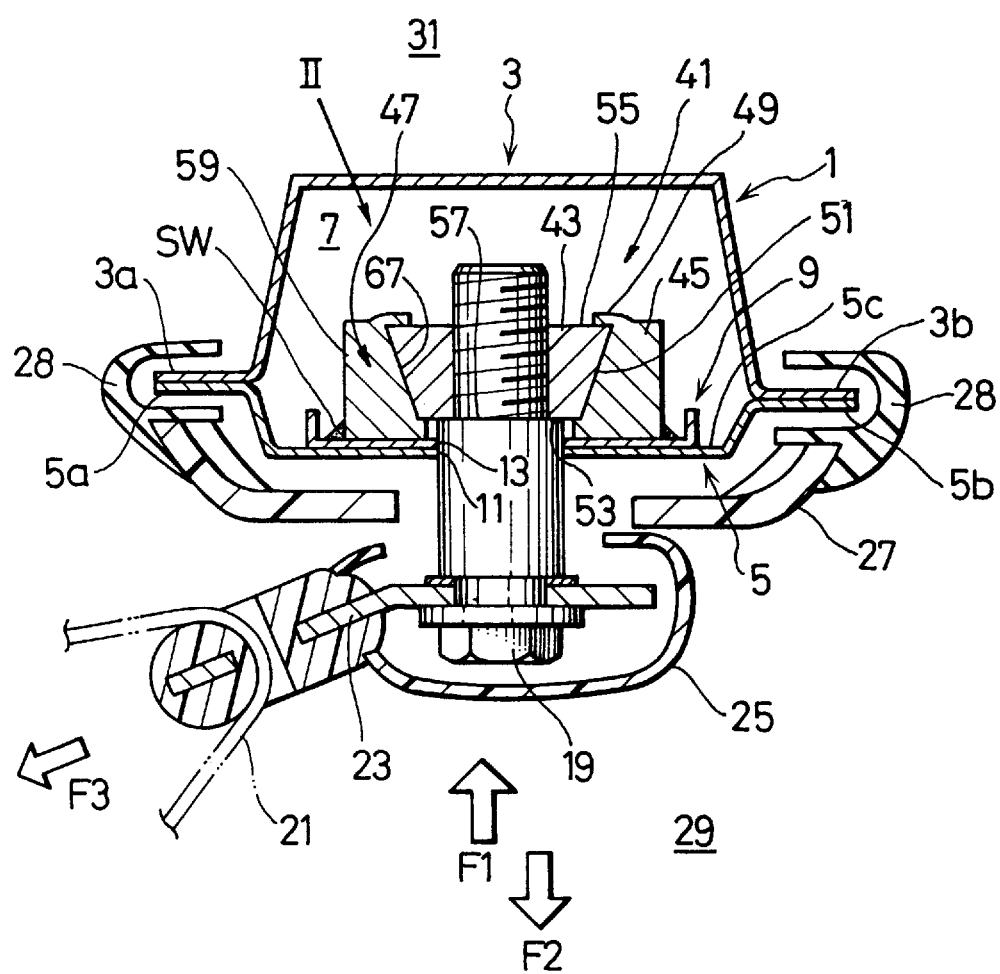
FIG. 1 is a sectional view showing a car body structure according to a first embodiment of the present invention.

Embodiments of the present invention will be explained with reference to accompanying drawings hereinbelow.

FIGS. 1 to 4 show a car body structure according to a first embodiment of the present invention.

This car body structure shows a seat belt anchor structure in a seat belt system for a car. For instance, in this structure, a nut member 41 is fixed to a pillar reinforcement 9 serving as a "pillar panel" and supported on an inner surface of a center pillar 1 serving also as the "pillar panel". A bolt 19 is screwed through the nut member 41 via through holes 11, 13 which are formed in the center pillar 1 and the pillar reinforcement 9 respectively. A seat belt anchor plate 23 is fixed with the bolt 19. A seat belt 21 is supported by the seat belt anchor plate 23 and passes the anchor plate freely.

The center pillar 1 comprises a center pillar outer panel 3 arranged on the outer side 31 of a car and a center pillar inner panel 5 arranged on the inner side 29 of a cabin of the car. Front and rear flanges 3a, 3b, 5a, 5b of the panels 3, 5 are welded together to form a hollow portion 7 which provides a confined space between the panels 3, 5.

The pillar reinforcement 9 is formed to have a ⊐-like sectional shape. The pillar reinforcement 9 is welded on to an inner surface 5c of the center pillar inner panel 5 in the center pillar 1, i.e., on a surface of the panel 5 on the hollow portion 7 side.

The nut member 41 comprises a nut main body 43 to which the bolt 19 is fixed, and a rectangular nut holder 45 which is supported on the pillar reinforcement 9 by virtue of welding SW to hold the nut main body 43.

An internal thread 48 into which the bolt 19 is screwed is formed through the nut main body shape 43 of the nut member 41. The nut main body has a substantial frustum of a pyramid, which is obtained by cutting off a top of a pyramid. Side surfaces 51 of the nut main body 43 are formed as slanting surfaces to be narrowed toward the inner side 29 of the cabin. In the nut main body 43, a surface 53 on the inner side 29 of the cabin is formed in substantially parallel with a surface 55 on the outer side 31 of the cabin.

The surface 53 on the inner side 29 of the cabin is so formed that a stepped portion 57 of the bolt 19 can be thrust thereon.

The nut holder 45 holds the nut main body 43 therein. The nut holder 45 is made up of a holder portion 47 which is formed to support a tensile load F2 applied to the nut main body 43, and four pawl portions 49 serving as engaging means which are formed integrally with an upper end portion 65 on four corner portions 50 of the holder portion 47 to support a compressive load F1 applied to the nut main body 43.

Figure 2:
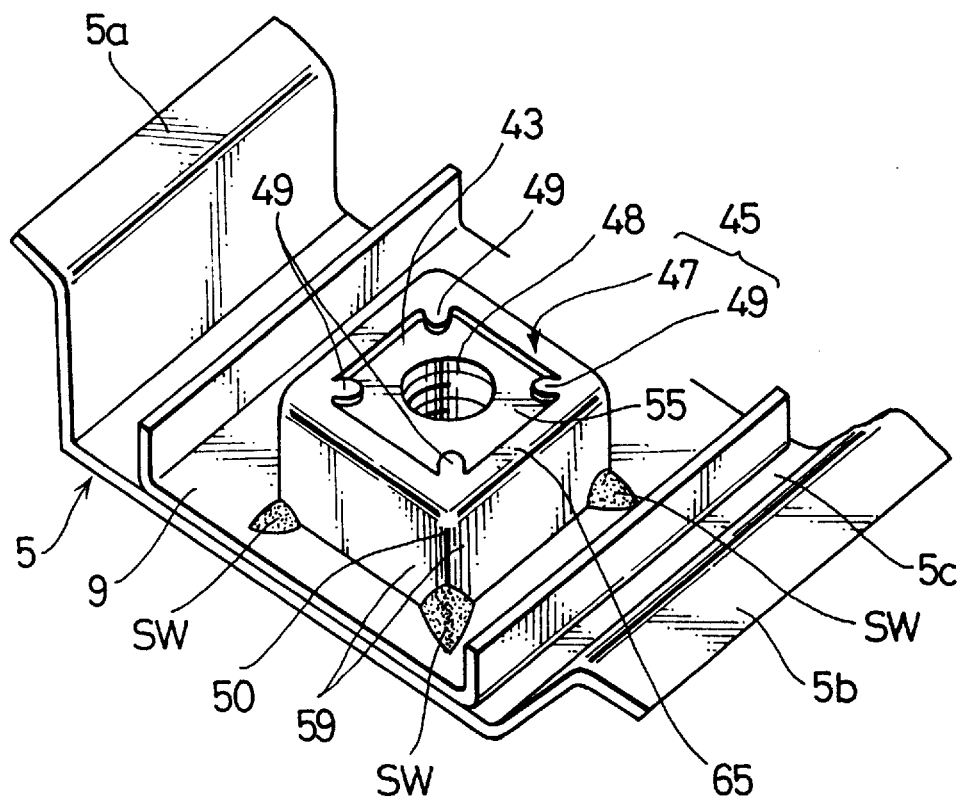
FIG. 2 is a perspective view showing a pertinent portion of FIG. 1 viewed from the direction indicated by an arrow II.

As shown in FIG. 2, the holder portion 47 of the nut holder 45 has rectangular side surfaces 59. The holder portion 47 has a through hole 63 through which the bolt 19 is passed, and slanting surfaces 67 which are inclined from the through hole 63 toward the upper end portion 65 of the holder portion 47.

In order to correspond to the side surfaces 51 of the nut main body 43, the slanting surfaces 67 are formed as a substantial frustum of a pyramid which is narrowed toward the outer side 29 of the car. In other words, the holder portion 47 and the nut main body 43 are so formed that, when the bolt 19 is screwed in the internal thread 48 of the nut main body 43 inserted into the holder portion 47, they contact each other to prevent rotation of the nut main body 43 in the holder portion 47.

The pawl portions 49 of the nut holder 40 are projected from the upper end portion 65 of the holder portion 47 of the nut holder 45 in a bendable manner, i.e., formed at positions on the outermost side 31 of the car, to abut on the surface 53 of the nut main body 43 in the nut member 41 on the outer side 31 of the cabin.

A cap 25 made of synthetic resin is provided on the bolt 19 and the seat belt anchor plate 23 to cover the bolt 19 and the seat belt anchor plate 23.

As shown in FIG. 1, reference 27 denotes a garnish molding which covers the center pillar inner panel 5 of the center pillar 1 to be hidden from the inner side 29.

As shown in FIG. 1, a reference 28 denotes a garnish molding which covers the front and rear flanges 3a, 3b, 5a, 5b of the center pillar outer panel 3 and the center pillar inner panel 5.

With the above structure of the first embodiment, in case the compressive load F1 of a predetermined value is applied to the bolt 19 and/or the seat belt anchor plate 23, such compressive load F1 is applied to the nut main body 43 of the nut member 41 via the bolt 19, as shown in FIG. 1. In this case, an allowable value of such compressive load F1 can be controlled by the pawl portions 49 because the compressive load F1 can be supported by the pawl portions 49 of the nut holder 45. Therefore, a controlling member having a stable compressive load resistance value can be provided in the seat belt anchor structure of the first embodiment since a relief load of the pawl portions 49 is determined according to shape and strength of material of the pawl portions 49.

Figure 3:
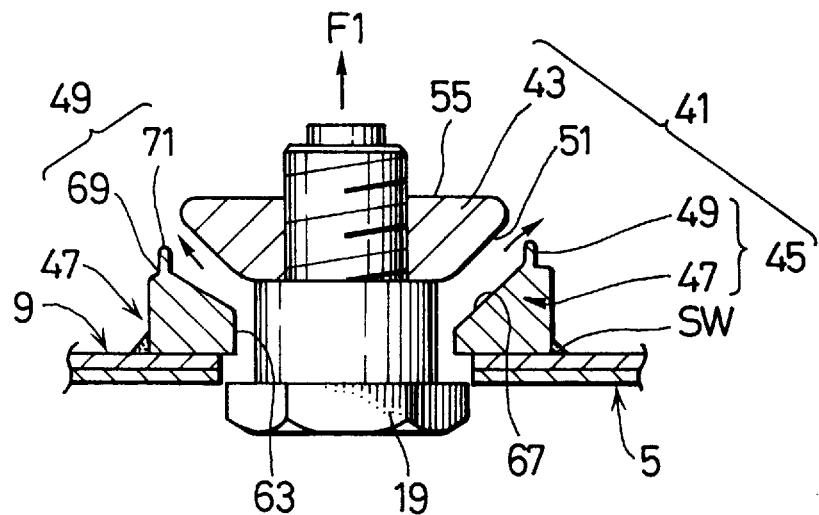
FIG. 3 is a sectional view showing the pertinent portion of FIG. 1 to which a compressive load is applied.

Still further, as described above, if a compressive load F1 of a predetermined value is applied to the bolt 19 and/or the seat belt anchor plate 23, such compressive load F1 is applied to the nut main body 43 of the nut member 41 via the bolt 19. In this case, as shown in FIG. 3, free ends 71 of the pawl portions 49 of the nut holder 45 are opened as indicated by an arrow with their base portions as rotational centers, so that the nut main body 43 of the nut member 41 as well as the bolt 19 can be moved toward the outer side 31 of the cabin. As a result, a large compressive load F1 can be firmly absorbed in the seat belt anchor structure of the first embodiment.

Figure 4:
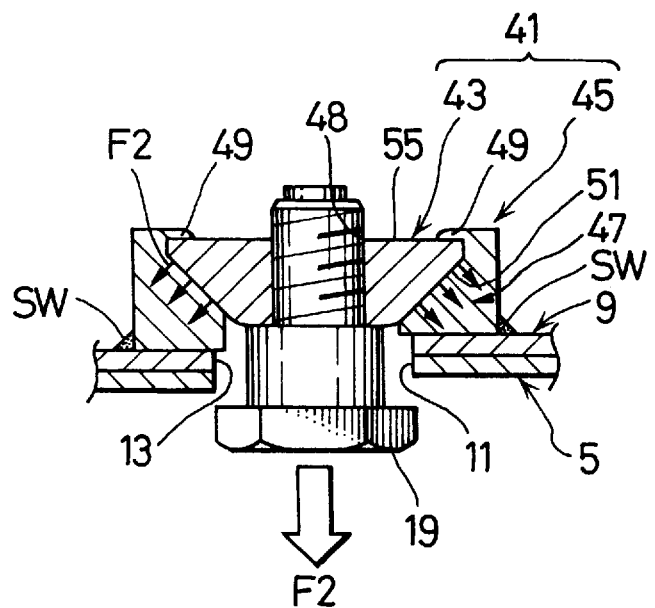
FIG. 4 is a sectional view showing the pertinent portion of FIG. 1 to which a tensile load is applied.

In contrast, as shown in FIG. 4, if a tensile load F2 greater than a predetermined value (about one ton) is applied to the bolt 19 and/or the seat belt anchor plate 23, such tensile load F2 is applied to the nut main body 43 of the nut member 41 via the bolt 19. In this event, side surfaces 51 of the nut main body 43 are fitted into the slanting surfaces 67 of the holder portion 47 of the nut holder 45 like a wedge, so that the tensile load F2 can be supported by the holder portion 47 of the nut holder 45. Therefore, a controlling member having a stable tensile load resistance value can be provided in the seat belt anchor structure of the first embodiment.

If, after the nut main body 43 of the nut member 41 is inserted into the slanting surfaces 67 of the holder portion 47 of the nut holder 45, the pawl portions 49 of the holder portion 47 are folded to cause the side surfaces 51 of the nut main body 43 of the nut member 41 to contact the slanting surfaces 67 of the holder portion 47, the pawl portions 49 can be pressed against the surface 55 of the nut main body 43 of the nut member 43 on the outer side of the cabin. As a result, the nut main body 43 can be firmly held in the nut holder 45.

In addition, under the condition where the nut main body 43 is fitted into the holder portion 47 of the nut holder 45 and then is held by the pawl portions 49, the nut holder 45 may be fixed to the pillar reinforcement 9 by welding, etc. Hence, an assembling operation of the nut holder 45 and the nut main body 43 to the pillar reinforcement 9 is simplified.

Further, because the nut main body 43 an be installed in the nut holder 43 substantially completely, space saving can be achieved.

Furthermore, since the holder portion 47 of the nut holder 45 and the nut main body 43 are fixed to each other with the bolt 19, the nut main body 43 can be prevented from being rotated in the holder portion 47. Therefore, a tightening operation of the bolt 19 to fix the seat belt anchor plate 23 can be facilitated.

Still further, the side surfaces 51 of the nut main body 43 are formed as inclined surfaces which are narrowed toward the inner side of the cabin while the slanting surfaces 67 corresponding to the side surfaces 51 of the nut main body 43 are formed in the holder portion 47 of the nut holder 45. For this reason, if the nut main body 43 is fitted into the holder portion 47 to coincide the slanting surfaces 67 with the side surfaces 51, the direction of internal thread 48 (bolt tightening hole) of the nut main body 43 is always regulated in a desired bolt tightening direction and as a result the nut main body 43 is held in a so-called "centering" state. Accordingly, a tightening operation of the bolt 19 can be carried out easily and firmly.

Moreover, in a usual case, the tensile load F2 applied to the nut main body 43 is a component of a tensile force F3 of the seat belt 21 which is applied to the seat belt anchor plate 23 in the obliquely forward direction of the car. Therefore, when the tensile load F2 is applied, a rotation force acts on the nut main body 43 in such a direction that a head of the bolt 19 falls forward in the car. Meanwhile, since the side surfaces 51 of the nut main body 43 and the slanting surfaces 67 of the holder portion 47 are formed as inclined surfaces which are narrowed toward the inner side of the cabin, both the nut main body 43 and the holder portion 47 have respective surfaces substantially perpendicular to the tensile force of the seat belt 21 toward the front side of the car. Accordingly, rotation of the nut main body 43 can be prevented satisfactorily by the slanting surfaces 67 of the holder portion 47, and rotation force input into the nut main body 43 can be prevented from applying to the pawl portions 49. As a result, reduction in strength of the pawl portions 49 because of input of the tensile force F3 of the seat belt 19 can be eliminated, so that the pawl portions 49 can be designed by taking into account the compressive load F1 only.

Figure 5:
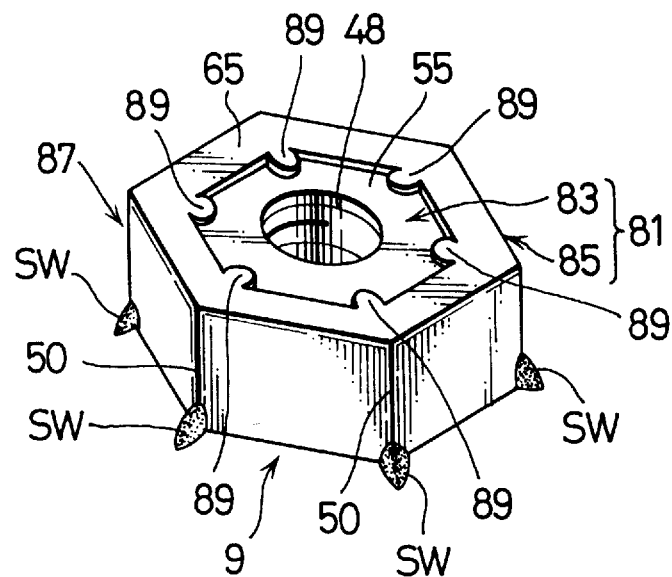
FIG.5 is a perspective view showing a car body structure according to a second embodiment of the present invention, which corresponds to FIG.2.

FIG. 5 shows a car body structure according to a second embodiment of the present invention. A main difference between the second embodiment and the first embodiment resides in shapes of a nut main body 83 of a nut member 81 and a nut holder 85.

The nut member 81 comprises a hexagonal nut main body 83 to which the bolt 19 (see FIG. 1) is tightened, and a hexagonal nut holder 85 fixed to the pillar reinforcement 9 by virtue of welding SW to hold the nut main body 83.

The nut holder 85 holds the nut main body 83 therein. The nut holder 85 is made up of a holder portion 87 which is formed to support a tensile load F2 applied to the nut main body 83 and six pawl portions 89 serving as engaging means which are formed integrally with an upper end portion 65 on six corner portions 50 of the holder portion 87 to support a compressive load F1 applied to the nut main body 83.

Figure 6:
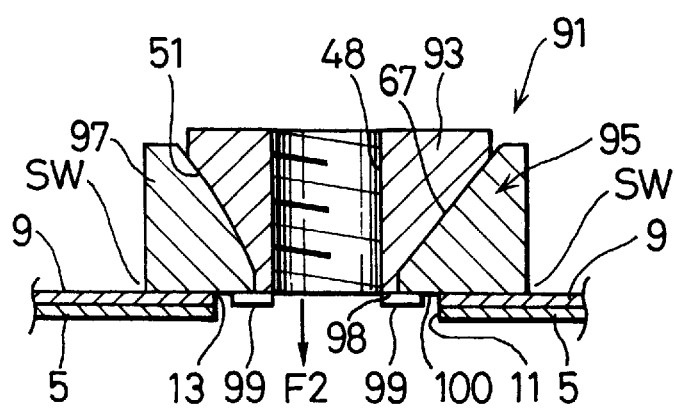
FIG. 6 is a sectional view showing a car body structure according to a third embodiment of the present invention, which corresponds to FIG.1.

FIG. 6 shows a car body structure according to a third embodiment of the present invention. A main difference between the third embodiment and the first embodiment resides in shapes of a nut main body 93 of a nut member 91 and a nut holder 95.

The nut member 91 is composed of a nut main body 93 to which the bolt 19 (see FIG. 1) is tightened, and a nut holder 95 fixed to the pillar reinforcement 9 by welding SW to hold the nut main body 93.

Pawl portions 99 serving as engaging means are formed integrally with the nut main body 93 to project from the innermost positions 98 in a bendable fashion such that the pawl portions 99 come into contact with a surface 100 of the holder portion 97 of the nut holder 95 on the innermost side of the car.

Accordingly, according to the third embodiment, if the pawl portions 99 of the holder portion 97 are folded to cause the side surfaces 51 of the nut main body 93 to contact the slanting surfaces 67 of the holder portion 97 after the nut main body 93 is inserted into the slanting surfaces 67 of the holder portion 97 of the nut holder 95, the pawl portions 99 can be pushed against the surface 100 of the holder portion 97 on the innermost side of the car. As a result, the nut main body 93 can be firmly held in the nut holder 95.

Figure 7:
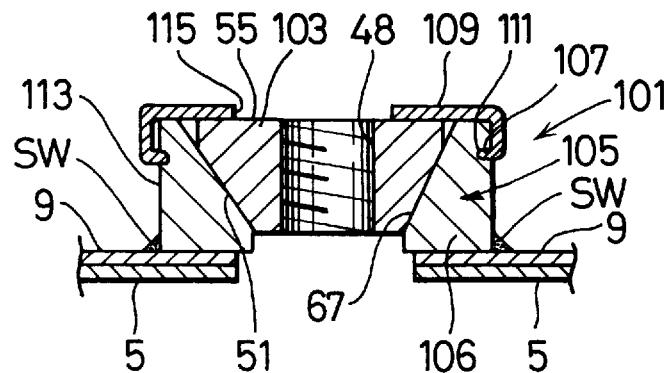
FIG 7 is a sectional view showing a car body structure according to a fourth embodiment of the present invention.
Figure 8:
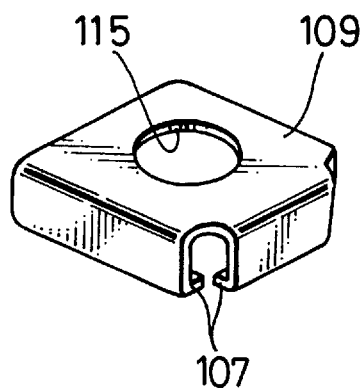
FIG.8 is a perspective view of the fitting portion of FIG. 7.

FIGS. 7 and 8 show a car body structure according to a fourth embodiment of the present invention. A main difference between the fourth embodiment and the first embodiment is in that a plate 109 serving as an engaging means is formed as a nut holding member which is a different body from a nut main body 103 and a nut holder 105 of a nut member 101.

The nut member 101 comprises a nut main body 103 to which the bolt 19 (see FIG. 1) is tightened, and a nut holder 105 fixed to the pillar reinforcement 9 by welding SW to hold the nut main body 103. The plate 109 has a fitting portion 107 which is able to be fitted into a recess 111 formed on a side surface 113 of the nut holder 105. The plate 109 can be secured on the outermost side of the nut main body 103 of the nut holder 105 by inserting the fitting portion 107 into the recess 111. In this state, the nut main body 103 is held in the nut holder 105.

The recess portion 111 and the fitting portion 107 are provided at such locations that, when the plate 109 is put on under the condition where the nut main body 103 is inserted into the slanting surfaces 67 of the holder 106, the plate 109 can hold the nut main body 103 by pressing the surface 55 of the nut main body 103 on the outermost side of the car while the side surfaces 51 of the nut main body 103 contact the slanting surfaces 67 of the holder portion 106.

A reference 115 denotes a relief hole formed in the plate 109 not to interfere with the bolt 19.

Hence, according to the fourth embodiment, the fitting portion 107 is fitted into the recess 111 while the plate 109 is pushed against the surface 55 of the nut main body 103 on the outermost side of the car by contacting the side surfaces 51 of the nut main body 103 with the slanting spaces 67 of the holder portion 106. Therefore, this structure enables the nut main body 103 to be surely held in the nut holder 105.

In addition, the engaging means is formed as the plate 109 which is provided as the different body from the nut main body 103 and the nut holder 105 of the nut member 101 and has the fitting portion 107 to be inserted into the recess 111 of the nut holder 105. For this reason, if the compressive load acting to the nut main body 103 is in excess of a predetermined value, impact applied to the seat belt anchor plate 23 can be absorbed by deformation of the fitting portion 107.

Moreover, an allowable compressive load (predetermined value) can be changed and adjusted easily to a desired value by modifying the and/or shape of the plate 109.

In the above embodiments, although only the center pillar has been explained as the "pillar panel", the scope of the present invention is not limited to the center pillar. It is of course that any car body structure member on which the seat belt anchor plate can be supported is included within a range of the present invention.

As discussed earlier, the above embodiments can achieve useful advantages such that the car body structure can be provided which can control an allowable value of the compressive load F1 to a predetermined value and at the same time can support the large tensile load F2 sufficiently.

What is claimed is:

1. A car body structure comprising:
    a pillar panel including an outer panel and an inner panel;
    a nut member arranged in a hollow portion between the outer panel and the inner panel; and
    a bolt fixed to said nut member, for supporting a seat belt anchor plate;
    wherein said nut member includes a nut main body to which said bolt is fixed, and a nut holder supported on said pillar panel, for holding said nut main body,
    said nut holder has a holder portion formed to support a tensile load applied to said nut main body, and
    at least one of said nut main body and said nut holder has an engaging portion for holding said nut main body in said holder portion and for supporting said nut main body until a compressive load applied to said nut main body is increased to a predetermined value.

2. A car body structure according to claim 1, wherein said engaging portion includes pawl portions formed integrally with at least one of said nut holder and said nut main body.

3. A car body structure according to claim 2, wherein said pawl portions project from said holder portion in a bendable manner so as to contact an outer surface of said nut main body.

4. A car body structure according to claim 2, wherein said pawl portions project upon said nut main body in a bendable manner to contact an inner surface of said holder portion of said nut holder.

5. A car body structure according to claim 1, wherein said engaging portion includes a nut holding member which is provided around an outer portion of said nut main body to hold said nut main body, and which has engaging portions engaging side surfaces of said nut holder.

6. A car body structure according to claim 1, wherein said holder portion and said nut main body are shaped such that said holder portion and said nut main body engage each other to prevent rotation of said nut main body within said holder portion when said holder portion and said nut main body are fixed with a bolt.

7. A car body structure according to claim 1, wherein side surfaces of said nut main body are slanted, and slanting surfaces are formed in said holder portion which are complementary to said side surfaces of said nut main body.

* * * * *